United States Patent [19]
Schutze

[11] Patent Number: 5,705,241
[45] Date of Patent: Jan. 6, 1998

[54] FIBRE-COMPOSITE ROD

[75] Inventor: Rainer Schutze, Braunschweig, Germany

[73] Assignee: Deutsche Forschungsanstalt fur Luft-und Raumfahrt e.V., Cologne, Germany

[21] Appl. No.: 672,747

[22] Filed: Jun. 28, 1996

[30] Foreign Application Priority Data

Jul. 1, 1995 [DE] Germany ................ 195 24 080.4

[51] Int. Cl.$^6$ ................................................ B32B 1/08
[52] U.S. Cl. ................. 428/36.3; 92/151; 92/170.1; 92/171.1
[58] Field of Search ................. 428/36.3; 92/151, 92/170.1, 171.1; 138/155; 403/345

[56] References Cited

FOREIGN PATENT DOCUMENTS

| | | |
|---|---|---|
| 2247930 | 3/1992 | United Kingdom . |
| 2276690 | 5/1996 | United Kingdom . |
| WO 94/04844 | 3/1994 | WIPO . |

Primary Examiner—Alexander Thomas
Attorney, Agent, or Firm—Salter & Michaelson

[57] ABSTRACT

A rod with a tubular, fibre-composite wall, cut into two parts has actively controllable, pressure- and tension-generating elements which are effective in an axial direction of the rod, provided therebetween. An exterior pressure-generating element, which effects an elongation, takes the form of a cylindrical ring and is disposed on the outside of the rod elements. For the cylindrical ring, stop shoulders are formed on the outside of each of the rod elements. A second force-generating element is disposed inside the rod. Disposed in each of the two rod elements are loops or bends which are axially fixed to the rod elements and are guided around the axially opposite ends of the second force-generating element so that they in each case overlap or extend around the end of the second element which is directed axially away from the rod element in which the loops are fixed. Upon elongation of the second element, tensile forces are exerted upon the two rod elements and draw said two rod elements together.

13 Claims, 1 Drawing Sheet

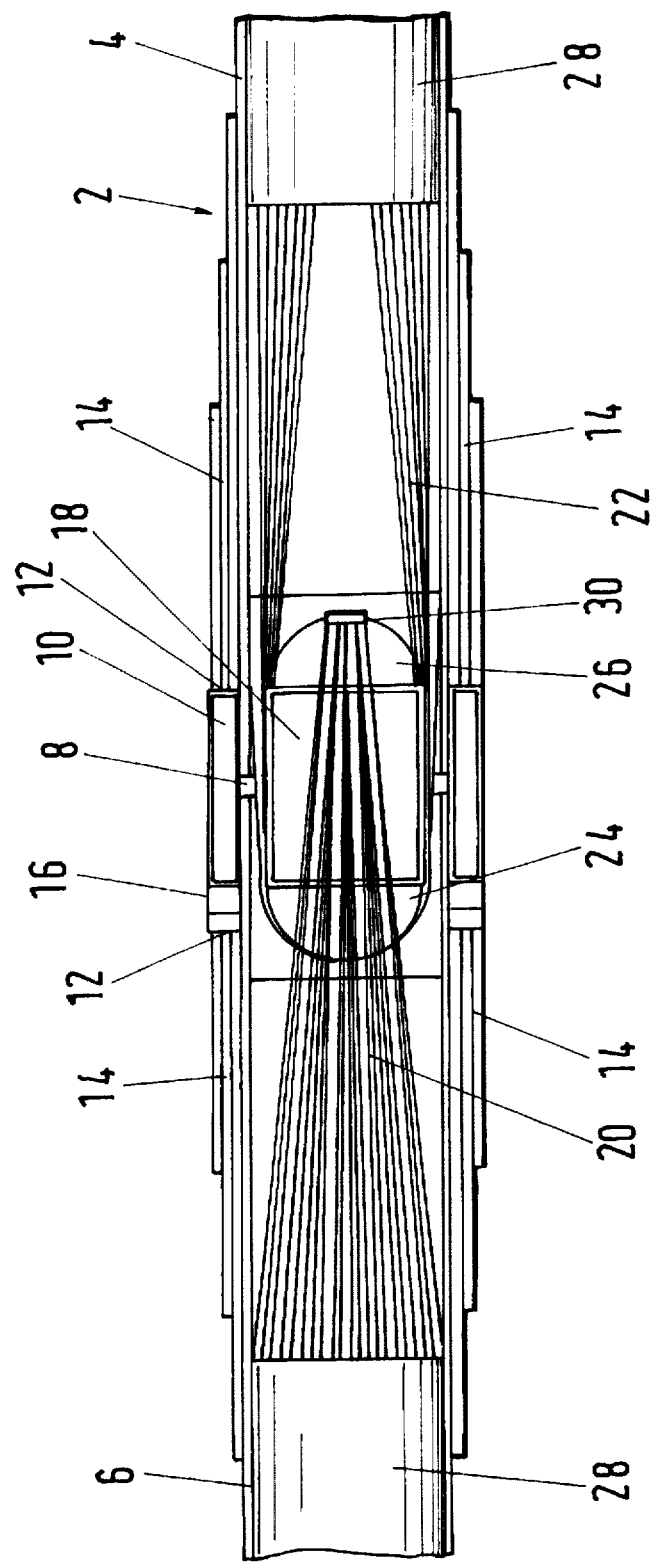

FIBRE-COMPOSITE ROD

BACKGROUND OF THE INVENTION

The invention relates to a fibre-composite rod and more particularly to a rod having a tubular fibre-composite wall and connection elements disposed at both ends.

In the case of a rod known from GB-A-2276690, disposed inside the rod is an actively controllable, pressure-generating element, the end faces of which rest against pressure disks which rest against the end faces of the two rod elements. Disposed over the region of the actively controllable element, on the outside of the tubular wall, is a sleeve which overlaps the adjacent ends of the two rod elements, is bonded to said rod elements and acts as a spring, by means of which restoring forces are exerted.

SUMMARY OF THE INVENTION

The present invention seeks, without using a spring element, to refine a rod of the above type in such a way that both for the lengthening and the shortening of the rod force-generating and/or actively controllable elements are fully effective at the ends of the rod.

According to the present invention there is provided a rod with two ends and a longitudinal axis and having a tubular fibre-composite wall comprising at least one layer of paraxial unidirectional fibres, a woven tube of fibres lying over said layer and crossing at an angle to the axis of the rod, said rod being provided at both said ends with a connection fitting for the axial introduction of tensile and/or compressive forces, said wall of said rod being cut through between said connection fittings to form two rod elements and there being disposed between said rod elements an actively controllable, first force-generating element, said first force-generating element being effective in the direction of said longitudinal direction of said rod to elongate the rod, and comprising a cylindrical ring disposed on the outside of said rod elements, stop shoulders for said first force-generating element being formed at the end of each of said rod elements, a second force-generating element being disposed inside said rod, and loops being disposed in each of said rod elements, said loops being axially fixed to said rod elements and guided around the axially opposite ends of said second force-generating element in such a way that they in each case overlap the end of said second force-generating element directed axially away from the rod element to which said loops are fixed, so that upon elongation of the second force-generating element tensile forces are exerted upon said rod elements tending to draw said rod elements together.

BRIEF DESCRIPTION OF THE DRAWING

A preferred embodiment of the present invention will now be described, by way of example only, with reference to the accompanying drawing, which shows in longitudinal section the middle region of a rod according to the invention.

DESCRIPTION OF THE PREFERRED EMBODIMENT

Basically the invention provides a rod having a tubular fibre-composite wall comprising at least one layer of paraxial unidirectional fibres, over which lies a woven tube of fibres crossing at an angle to the axis of the rod, the rod being provided at both ends with a connection fitting for the axial introduction of tensile and/or compressive forces, the wall of the rod being cut through between the connection fittings so that the rod is divided into two rod elements and there being disposed between the rod elements an actively controllable, first force-generating element, which is effective in an axial direction to elongate the rod, and which takes the form of a cylindrical ring disposed on the outside of the rod elements, stop shoulders for said first force-generating element being formed at the end of each of the rod elements, a second force-generating element being disposed inside the rod, and loops being disposed in each of the two rod elements, which are axially fixed to the rod elements and guided around the axially opposite ends of the second force-generating element in such a way that they in each case overlap the end of the second force-generating element directed axially away from the rod element to which the loops are fixed, so that upon elongation of the second element tensile forces are exerted upon the two rod elements tending to draw said two rod parts together.

In preferred embodiments, the force-generating elements are actively controllable to generate pressure and tension.

Referring now to the drawing, the rod 2 comprises two rod elements 4,6, the ends of which are directed towards one another and lie at a distance 8 apart. The rod 2 is therefore cut through in said region.

Connection elements are disposed at the outer ends of the two rod elements 4,6 in a known manner, e.g. in the manner described in GB-A-2276690 and DE-40 29 008 C1.

Disposed in the region of the separating gap 8, at the outside, is an annular pressure-generating element 10 which is actively controllable. The end faces of said element rest against shoulders 12, which are formed by elements 14 supported on the adjacent ends of the rod elements and firmly connected to the surface of the rod elements. Said elements 14 may be formed by a layer of unidirectional fibres. It is however alternatively possible to provide metal sleeves, which are bonded externally onto the rod ends.

Adjusting means 16 are advantageously provided between at least one of the stop shoulders 12 and the adjacent end faces of the cylindrical ring-shaped element 10. Said adjusting means may be, for example, pairs of rings which are connected to one another by a fine-pitch thread. By turning the rings, the distance between the supporting surfaces is adjustable. The pairs of rings may also be constructed with axially directed bevels, the bevels preferably being constructed with a self-locking angle of inclination. Such axially effective adjusting means are known as such and therefore do not need to be described in further detail here.

The two rod elements 4, 6 may be guided axially by the annular element 10. Guidance may however alternatively be effected by one of the elements 14, which then has to be constructed in such a way that the separating gap is overlapped. The element 10 then lies axially offset relative to the separating gap on one of the two rod elements 4,6.

Disposed inside the rod 2, preferably in the region of the separating gap 8, is a likewise axially effective, force- or pressure-generating element 18. Said element 18 acts in an axial direction counter to the movement of the cylindrical ring-shaped element 10. It is overlapped on both sides by fibre loops 20,22 guided over pressure elements in the form of dome-shaped attachments or extensions 24,26, which rest against the axially directed end faces of the element 18.

The fibre loops or bends at their fixing end are fanned out into a ring shape and fastened to the inside of the rod elements 4,6. They may, for example, each be bonded, in the region remote from the separating gap 8 in the undisturbed part of the rod elements 4,6, to the outside of an annular insert 28 which is then in turn bonded at the inside of the rod elements 4, 6 to the latter. The pressure elements 26 and 24 are provided with grooves 30 for guiding the loops.

The two loops 20,22 are disposed offset by 90° relative to one another, in the manner shown in the drawing.

By means of the element 18 in conjunction with the loops, which are in each case guided over the end of the element 18 directed away from the rod in which the loops are fastened, a change in the length of the element 18 causes a force to be exerted upon the two rod elements 4,6, which draws said rod elements together. Said force is therefore opposed to the force exerted by the element 10, by means of which the two rod elements are pressed apart from one another.

The two elements 10 and 18 are actively controllable. Piezoelectric transducers are preferably provided for said purpose. The two piezoelectric transducers are connected up in such a way as to cooperate without play, e.g. in such a way that, in the de-energized state of both piezoelectric transducers, the tensile and/or compressive forces are balanced. The drive therefore operates without play. The mechanical freedom from play may be achieved by the adjusting means 16 described above.

Instead of electrically controllable piezoelectric transducers it is also possible to provide, as pressure-generating elements, bodies made of an alloy with a shape-memory capability, which are effective in a temperature-controlled manner.

By virtue of the parallel connection of the pressure-generating elements it is possible to utilize their forces directly to adjust the rod elements of the active rod without any load or displacement limitation by a tensioned spring, as is the case with the rod according to GB-A-2276690 where the outer, expansion-compliant tension sleeve acts as a spring.

It will be understood that the above description of the present invention is susceptible to various modifications, changes and adaptations.

What is claimed is:

1. A rod with two ends and a longitudinal axis and having a tubular fibre-composite wall comprising at least one layer of paraxial unidirectional fibres, a woven tube of fibres lying over said layer and crossing at an angle to the axis of the rod, said rod being provided at both said ends with a connection fitting for the axial introduction of tensile and/or-compressive forces, said wall of said rod being cut through between said connection fittings to form two rod elements and there being disposed between said rod elements an actively controllable, first force-generating element, said first force-generating element being effective in the direction of said longitudinal direction of said rod to elongate the rod, and comprising a cylindrical ring disposed on the outside of said rod elements, stop shoulders for said first force-generating element being formed at the end of each of said rod elements, a second force-generating element being disposed inside said rod, and loops being disposed in each of said rod elements, said loops being axially fixed to said rod elements and guided around the axially opposite ends of said second force-generating element in such a way that they in each case overlap the end of said second force-generating element directed axially away from the rod element to which said loops are fixed, so that upon elongation of the Second force-generating element tensile forces are exerted upon said rod elements tending to draw said rod elements together.

2. A rod according to claim 1, wherein said second force-generating element is provided at its two ends with rounded caps, over which said loops are guided.

3. A rod according to claim 2, wherein said rounded caps are provided with guide grooves for said loops.

4. A rod according to claim 1, wherein said loops are disposed offset by 90°.

5. A rod according to claim 1, wherein said loops are formed by unidirectional fibres.

6. A rod according to claim 5, wherein said unidirectional fibres forming said loops are brought together in the region of the bend of the loop and in the remaining regions are fanned out in a ring and fastened inside said two rod elements.

7. A rod according to claim 1, wherein axially effective adjusting means are provided between at least one end of said cylindrical ring and the respective one of said stop shoulders.

8. A rod according to claim 7, wherein said adjusting means comprises rings, said rings being adjustably connected to one another by threads.

9. A rod according to claim 7, wherein said adjusting means comprises rings with axially directed bevels.

10. A rod according to claim 1, wherein piezoelectric transducers are provided as said force-generating elements.

11. A rod according to claim 10, and comprising a circuit, said piezoelectric transducers being controllable in opposite directions by said circuit.

12. A rod according to claim 1, wherein bodies made of an alloy with a shape-memory capability are provided as said force-generating elements.

13. A rod with two ends and a longitudinal axis, the rod having a tubular wall, the rod being provided at both ends thereof with a connection fitting, the tubular wall being cut through between the connection fittings to form two rod elements, the rod further comprising:

an actively controllable, first force-generating element disposed between the rod elements, said first force-generating element being effective in the direction of said longitudinal axis of the rod to elongate the rod;

a cylindrical ring disposed on the outside of the rod elements;

a second force-generating element disposed inside the rod; and loops disposed in each of the rod elements, said loops being axial fixed to the rod elements and guided around the axially opposite ends of the second force-generating element in such a way that they in each case overlap the end of the second force-generating element directed axially away from the rod element to which the loops are fixed, so that upon elongation of the second force-generating element tensile forces are exerted upon the rod elements tending to draw the rod elements together.

* * * * *